(12) United States Patent
Agirman et al.

(10) Patent No.: US 10,246,294 B2
(45) Date of Patent: Apr. 2, 2019

(54) BUS CAPACITOR BANK CONFIGURATION FOR A REGENERATIVE DRIVE

(71) Applicant: OTIS ELEVATOR COMPANY, Farmington, CT (US)

(72) Inventors: Ismail Agirman, Southington, CT (US); Steven M. Millett, Plainville, CT (US); HanJong Kim, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 25 days.

(21) Appl. No.: 15/104,101

(22) PCT Filed: Dec. 18, 2013

(86) PCT No.: PCT/US2013/076190
§ 371 (c)(1),
(2) Date: Jun. 13, 2016

(87) PCT Pub. No.: WO2015/094235
PCT Pub. Date: Jun. 25, 2015

(65) Prior Publication Data
US 2017/0029242 A1   Feb. 2, 2017

(51) Int. Cl.
*H02P 27/08* (2006.01)
*B66B 1/30* (2006.01)
(Continued)

(52) U.S. Cl.
CPC .............. *B66B 1/302* (2013.01); *B66B 11/04* (2013.01); *H02P 27/08* (2013.01); *B66B 9/00* (2013.01)

(58) Field of Classification Search
USPC ......................................................... 187/290
See application file for complete search history.

(56) References Cited

U.S. PATENT DOCUMENTS 7,227,323 B2   6/2007 Yamada et al.
7,233,124 B2 *  6/2007 Takeoka .................. H02P 23/06
                                              318/376
(Continued)

FOREIGN PATENT DOCUMENTS

CN       1930071 A       3/2007
CN       1984831 A       6/2007
(Continued)

OTHER PUBLICATIONS

International Search Report and Written Opinion for application PCT/US2013/016190; dated Sep. 23, 2014. 12 pages.
(Continued)

*Primary Examiner* — Christopher Uhlir
(74) *Attorney, Agent, or Firm* — Cantor Colburn LLP

(57) ABSTRACT

A regenerative elevator drive device, a method for buffering energy of a regenerative elevator drive device, and an elevator system are disclosed. The regenerative elevator drive device may include an inverter having a plurality of power components and a converter having a plurality of power components. The regenerative drive may further include a direct current (DC) link bridging the inverter and the converter, the DC link including a first capacitor bridging the inverter and the converter and a second capacitor in parallel with the first capacitor. The regenerative elevator drive device may be a multi-level regenerative drive device.

20 Claims, 8 Drawing Sheets

(51) Int. Cl.
*B66B 11/04* (2006.01)
*B66B 9/00* (2006.01)

(56) References Cited

U.S. PATENT DOCUMENTS

| | | | | |
|---|---|---|---|---|
| 7,837,011 | B2* | 11/2010 | Takasaki | B66B 1/30 |
| | | | | 187/290 |
| 2005/0224296 | A1 | 10/2005 | Smith et al. | |
| 2006/0250107 | A1 | 11/2006 | Jadric et al. | |
| 2010/0117570 | A1* | 5/2010 | Nishimori | H02M 7/003 |
| | | | | 318/400.3 |
| 2014/0084817 | A1* | 3/2014 | Bhavaraju | B60L 11/005 |
| | | | | 318/139 |
| 2014/0226384 | A1* | 8/2014 | Yoshikawa | H02M 7/537 |
| | | | | 363/131 |
| 2014/0233278 | A1* | 8/2014 | Li | H02M 7/53873 |
| | | | | 363/37 |
| 2015/0054443 | A1* | 2/2015 | Swamy | H02P 27/16 |
| | | | | 318/504 |

FOREIGN PATENT DOCUMENTS

| | | |
|---|---|---|
| CN | 103095168 A | 5/2013 |
| JP | 2003292257 A | 10/2003 |
| JP | 2004307133 A | 11/2004 |
| KR | 1020130019897 A | 2/2013 |
| WO | 2006016002 A1 | 7/2005 |

OTHER PUBLICATIONS

European Search Report for application EP 13899897.6, dated Aug. 22, 2017, 7 pgs.
CN First Office Action and English Translation; Application No. CN 201380081742.5; dated Nov. 17, 2017; 14 pages.
CN Second Office Action and English Translation; Application No. CN 201380081742.5; dated May 30, 2018; 13 pages.
CN Third Office Action and English Translation; Application No. CN 201380081742.5; dated Oct. 29, 2018; 15 pages.

* cited by examiner

BUS CAPACITOR BANK CONFIGURATION FOR A REGENERATIVE DRIVE

TECHNICAL FIELD OF THE DISCLOSURE

The present disclosure relates to power systems and, more specifically, to a regenerative drive power system for an elevator system.

BACKGROUND OF THE DISCLOSURE

Elevator systems may be designed to operate over a specific input voltage range from a power source. The components of the drive of the elevator have voltage and current ratings that may allow the drive to continuously operate while the power supply remains within the designed input voltage range. However, in some scenarios, the local power supply of the utility network is less reliable, such as scenarios in which the utility voltage sags, brownout conditions occur (e.g., voltage conditions below the tolerance band of the elevator drive) and/or power loss conditions become prevalent. When such utility failures occur, the drive draws more current from the power supply to maintain uniform power to the hoist motor. In conventional systems, when excess current is drawn from the power supply, the drive may shut down to avoid damaging components of the drive.

When power sag or power loss occurs, the elevator may become stalled between floors in the elevator hoistway until the power supply returns to the nominal operating voltage range. In conventional systems, passengers in the elevator would be captive until a maintenance worker is able to release a brake for controlling cab movement upwardly or downwardly to allow the elevator to move to the closest floor. Elevator system designs may combat these issues during power sag or loss by employing automatic rescue operations including electrical storage devices that are controlled after power failure to provide power to move the elevator to the next floor for passenger release.

In recent elevator designs, the drive of the elevator may employ a regenerative drive system. A regenerative drive delivers power to the motor from a main power supply during the normal operating condition and delivers power from a backup power supply in the case of a power failure operating condition (e.g., power sag, power loss, etc.). Regenerative drives may include a converter on the input or power utility grid side and an inverter on the motor side, wherein power demand of the inverter is matched by an appropriate power capability on the converter. Such regenerative drives may need strict regulation by a controller to provide available power to the motor and to the backup power supply. Examples of such devices are further detailed in U.S. Patent Publication No. 2012/0261217 ("Regenerative Drive with Backup Power Supply").

A regenerative drive for an elevator has positive and negative power demands, which means that when the drive has a positive demand it may draw external power (e.g., from a local power source) and when it has negative power demands it produces electricity as a generator. Therefore, the voltages across various components must be strictly regulated and managed in regeneration scenarios, which is when the motor produces energy as a generator in negative power scenarios. A direct current (DC) link may be present, bridging the inverter and converter to smooth power output and buffer the output current of the inverter and converter.

In such designs, management of acoustic noise, efficiency, neutral point stability, and thermal balancing is imperative to the success of the design. As such, the DC link bridging the inverter and converter must be designed having one or more capacitors to smooth the current and manage the mentioned power interferences. The DC link may include capacitors, including film capacitors and electrolytic capacitors; however, said capacitors may have inefficiencies and/or short lifespans.

Electrolytic capacitors have greater capacitance than film capacitors at lower cost; however, the lifespan of a film capacitor is, generally, greater than the lifespan of an electrolytic capacitor having the same capacitance. If an electrolytic capacitor internal to the regenerative drive fails, much time and cost is involved with the repair and replacement of said electrolytic capacitor within the regenerative drive. Therefore, a need exists to design a DC link having a capacitor link which provides the desired capacitance while maintaining robustness and cost efficiency.

SUMMARY OF THE DISCLOSURE

In accordance with one aspect of the disclosure, a regenerative elevator drive device is disclosed. The regenerative elevator drive device may include an inverter having a plurality of power components and a converter having a plurality of power components. The regenerative drive may further include a direct current (DC) link bridging the inverter and the converter, the DC link including a first capacitor bridging the inverter and the converter and a second capacitor in parallel with the internal capacitor.

In a refinement, the first capacitor may be a film capacitor.

In a refinement, the second capacitor may be an electrolytic capacitor.

In a refinement, the capacitance of the second capacitor may be greater than the capacitance of the first capacitor.

In a refinement, at least one member of the plurality of power components of the inverter is an insular-gate bipolar transistor.

In a refinement, at least one member of the plurality of power components of the converter is an insular-gate bipolar transistor.

In a refinement, the regenerative elevator drive may be a multi-level regenerative drive.

In a further refinement, the plurality of power components of the inverter and the plurality of power components of the converter are may be arranged having a T-Type topology.

In another further refinement, the plurality of power components of the inverter and the plurality of power components of the converter are may be arranged having a neutral-point-clamped type topology.

In another further refinement, the plurality of power components of the inverter and the plurality of power components of the converter are may be arranged having an advanced T-Type neutral point clamped topology.

In yet a further refinement, at least one member of the plurality of power components of the inverter and at least one member of the plurality of power components of the converter is a reverse-blocking insular-gate bipolar transistor.

In accordance with another aspect of the disclosure, a method for buffering energy in a regenerative elevator drive device is disclosed, the elevator drive device including an inverter having a plurality of power components and a converter having a plurality of power components. The method may include providing a first capacitor bridging the inverter and the converter for energy buffering and connecting a second capacitor in parallel with the internal capacitor for energy buffering.

In a refinement, the regenerative elevator drive device may be a multi-level regenerative elevator drive device.

In accordance with another aspect of the disclosure, an elevator system is disclosed. The elevator system may include an elevator car disposed in a hoistway, a motor operatively connected to the elevator car, the motor generating a thrust force to move the elevator car within the hoistway, a power source operatively connected to the motor, the power source supplying power to the motor. The elevator system may further include a regenerative elevator drive device operatively connected to the power source and the motor. The regenerative elevator drive device may include an inverter having a plurality of power components, a converter having a plurality of power components, and a direct current (DC) link bridging the inverter and converter the DC link having a first capacitor bridging the inverter and the converter. The elevator system may further include a second capacitor in parallel with the first capacitor of the regenerative elevator drive device.

In a refinement, the regenerative elevator drive device may be a multi-level regenerative elevator drive device.

In a further refinement, the plurality of power components of the inverter and the plurality of power components of the inverter may be arranged having a neutral point clamped type, a T-type, or an advanced t-type neutral point clamped type topology.

In a refinement, the second capacitor may be accessible independent of the regenerative elevator drive device.

In a refinement, at least one member of the plurality of power components of the inverter and at least one member of the plurality of power components for the converter is an insular-gate bipolar transistor.

In a refinement, at least one member of the plurality of power components of the inverter and at least one member of the plurality of power components for the converter is a reverse blocking insular-gate bipolar transistor

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE DRAWINGS

Figure 1:
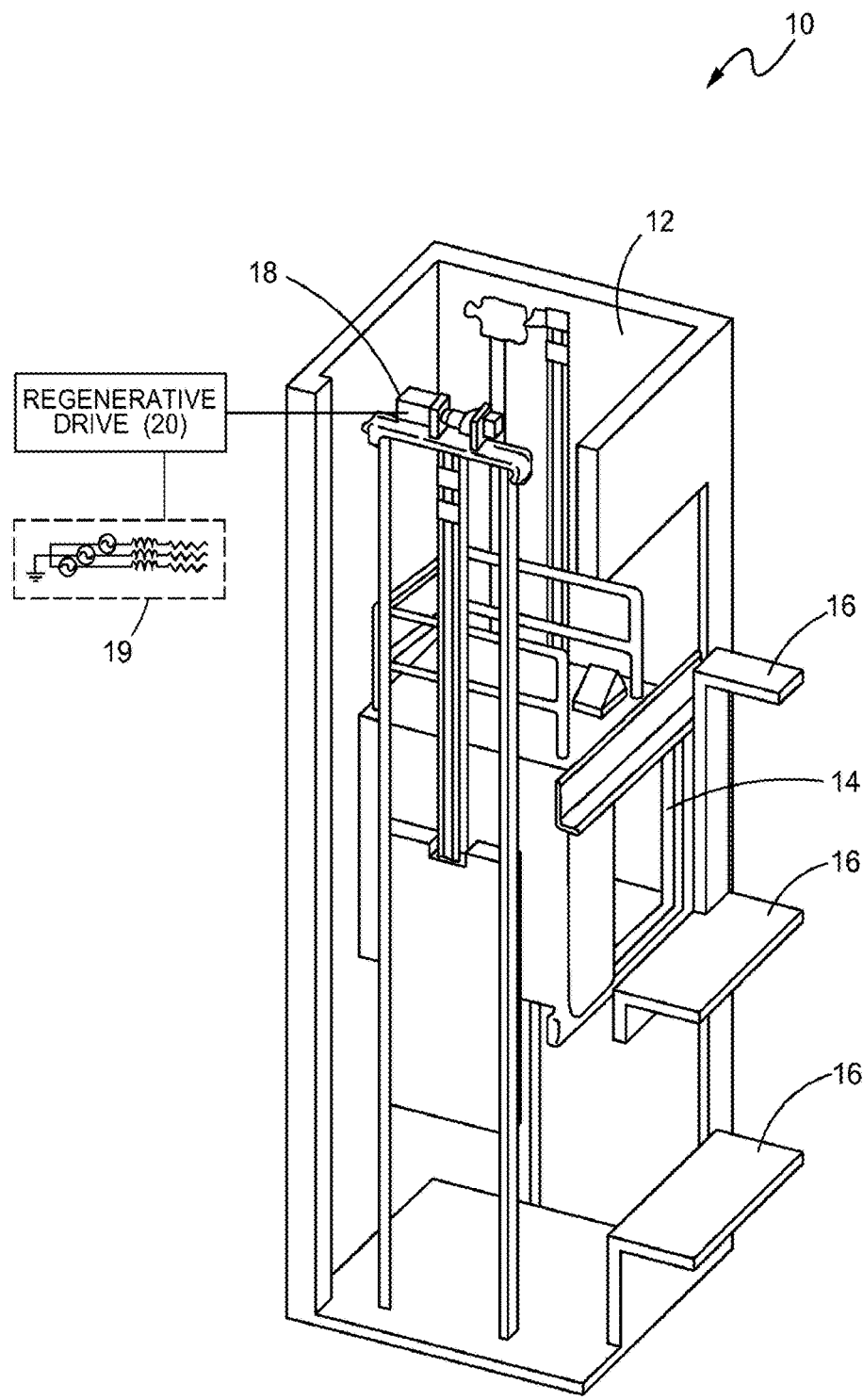
FIG. 1 is a schematic representation of an elevator system, according to one embodiment of the present disclosure.

Referring now to FIG. 1, a schematic diagram of an elevator system 10 is provided. It is to be understood that the depicted elevator system of FIG. 1 is for illustrative purposes only and to assist in disclosing various embodiments of the invention. As is understood by a person skilled in the art, FIG. 1 does not depict all of the components of an exemplary elevator system, nor are the depicted features necessarily included in all elevator systems.

The elevator system may reside fully or partially in a hoistway 12 that is vertically disposed within a building. The hoistway 12 may provide a vertical path through which an elevator car 14 may travel between floors or landings 16 of the building. A motor 18, or other prime mover, may be operatively connected to the elevator car 14 in order to generate a thrust force to move the elevator car 14 within the hoistway 12.

A power source 19 may be operatively connected to the motor 18 in order to supply power to the motor. The power source 19 may be externally generated power such as from a power utility grid. The motor 18 and power source 19 may each be three-phase. In addition, a regenerative drive 20 may be coupled to the motor 18 and the power source 19 in order to operate the motor 18 to achieve the desired elevator car 14 movement.

Figure 2:
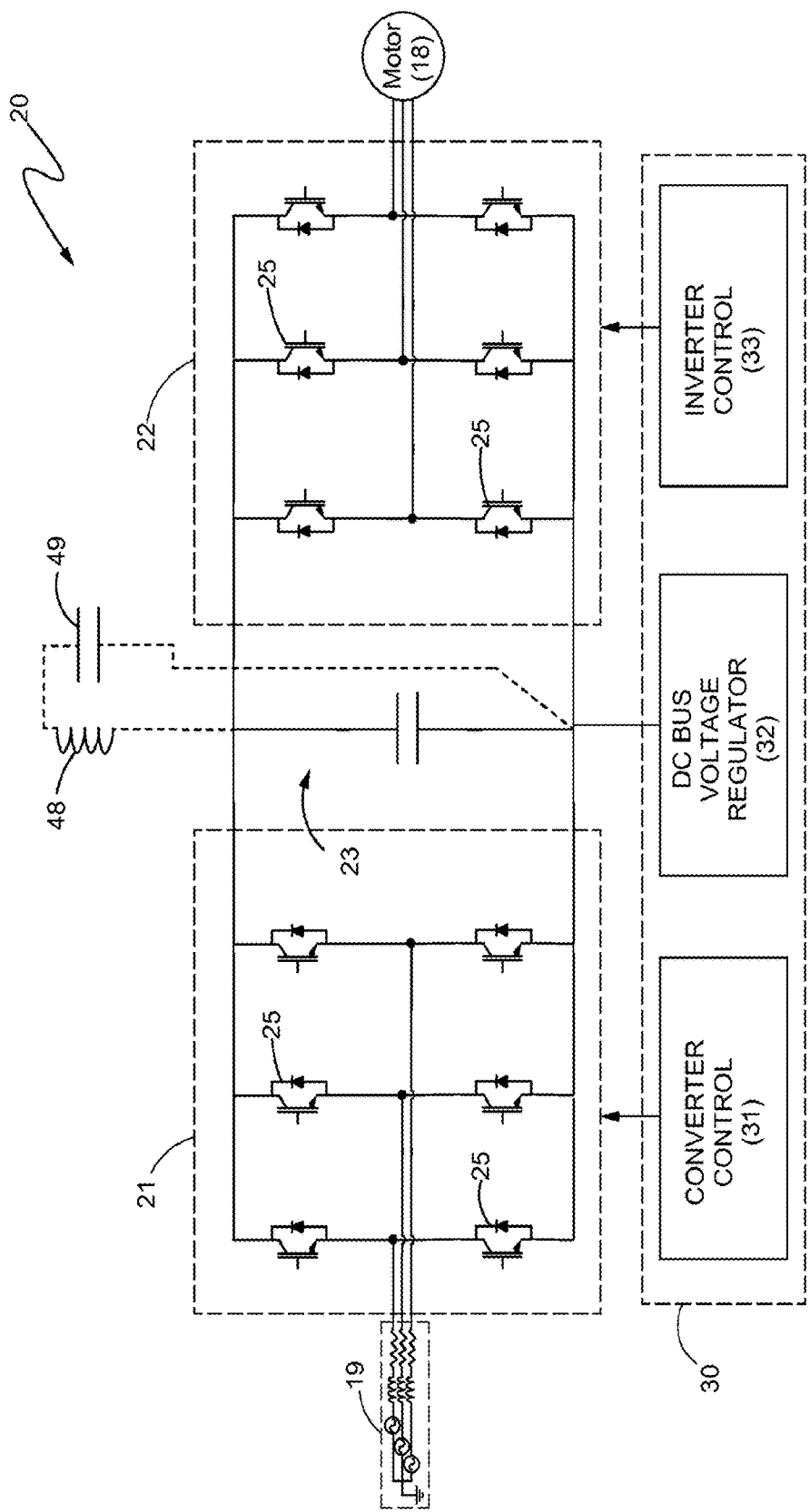
FIG. 2 is a schematic representation of a regenerative drive for the elevator system of FIG. 1.

Turning to FIG. 2, an exemplary regenerative drive device 20 is shown. The regenerative drive 20 may generally include a converter 21 operatively associated with the power supply 19 and an inverter 22 operatively associated with the motor 18. More specifically, the converter 21 may be operatively connected with three phases of the power source 19. The inverter 22 may be operatively connected to the motor 18. Additionally, the inverter 22 and converter 21 may be connected by a DC link 23, the DC link 23 having a positive link 45, a negative link 46, a converter neutral point 41, and an inverter neutral point 42. In some examples, the converter neutral point 41 and the inverter neutral point 42 may be connected. Alternatively, the converter neutral point 41 and the inverter neutral point 42 may be independent neutral points.

The DC link 23 may be designed to absorb ripple current created by the inverter 22 or the converter 21 and/or to absorb regenerated energy from the motor in the event of a sudden unexpected elevator stop or a sudden disconnection of the power source 19. To absorb the ripple currents, the DC link 23 may include one or more capacitors 43 to smooth the ripple current and propagating harmonics. Additionally, the DC link 23 may include one or more secondary capacitors 49 connected in parallel to the internal capacitor 43 to assist the internal capacitor 43 with smoothing the ripple current. The secondary capacitor 49 is connected to the regenerative drive 20, at the DC link 23, in parallel with the internal capacitor 43. In some examples, the external capacitor 49 may be located outside of the main circuit of the regenerative drive 20 while the capacitor 43 is integral in the regenerative drive circuit 20 as shown. The secondary capacitor 49 may be externally accessible independent of the regenerative drive 20.

The capacitor 43 and/or the secondary capacitor 49 may be film capacitors. Film capacitors may provide a robust design having a long life. Alternatively, the capacitor 43 and/or the secondary capacitor 49 may be electrolytic capacitors. Electrolytic capacitors provide high energy buffering capability at low cost. Film capacitors may have a greater life expectancy than electrolytic capacitors. In some embodiments, the capacitor 43 may be a film capacitor while the secondary capacitor 49 may be an electrolytic capacitor. In such embodiments, the film capacitor may provide a long life for the internal circuitry of the regenerative drive 20 while the secondary capacitor 49 may handle greater energy buffering capabilities associated with electrolytic capacitors; therefore, in cases of failure in the electrolytic secondary capacitor 49, the regenerative drive circuit 20 need not be repaired because the secondary capacitor 49 may be accessed independent of the regenerative drive 20. The secondary capacitor 49 may have greater capacitance than the capacitor 43. Alternatively, the capacitor 43 and the secondary capacitor 48 may both be film capacitors. In some such examples, the capacitor 43 may be a small film capacitor on a printed circuit board assembly (PCBA) associated with the regenerative drive 20 while the secondary capacitor 48 may be a larger film capacitor independent of the PCBA. Thusly, the size of the PCBA may be minimized.

In some example embodiments of the regenerative drive 20, an inductance may exist between the secondary capacitor 49 and the other elements of the DC link 23. The inductance may be provided by an inductor 48. Additionally or alternatively, the inductance may be parasitic inductance due to potentially long wires and/or bus bars connected to the capacitor 49.

A controller 30 may be used to control the power devices 25 of the regenerative drive. The controller 30 may include a converter control 31, an inverter control 33, and a DC bus regulator 32. The converter control 31 and the inverter control 32 may send logic signals, respectively, to the power devices 25 of the converter 21 and the power devices 25 of the inverter 22. The DC bus voltage regulator 33 may regulate voltages associated with the positive pole 45, negative pole 44, inverter neutral point 42, and/or the converter neutral point 41 of the DC link 23. The controller 30 may comprise any non-transitory computer readable storage medium having stored thereon computer executable instructions, such as, at least one computer processor. The controller may be programmed to apply pulse width modulation (PWM) to the converter 21 and inverter 22. PWM is a modulation technique used to control the power supplied to the motor 18. PWM techniques may include, for example, unipolar switching and bipolar switching.

Figure 3:
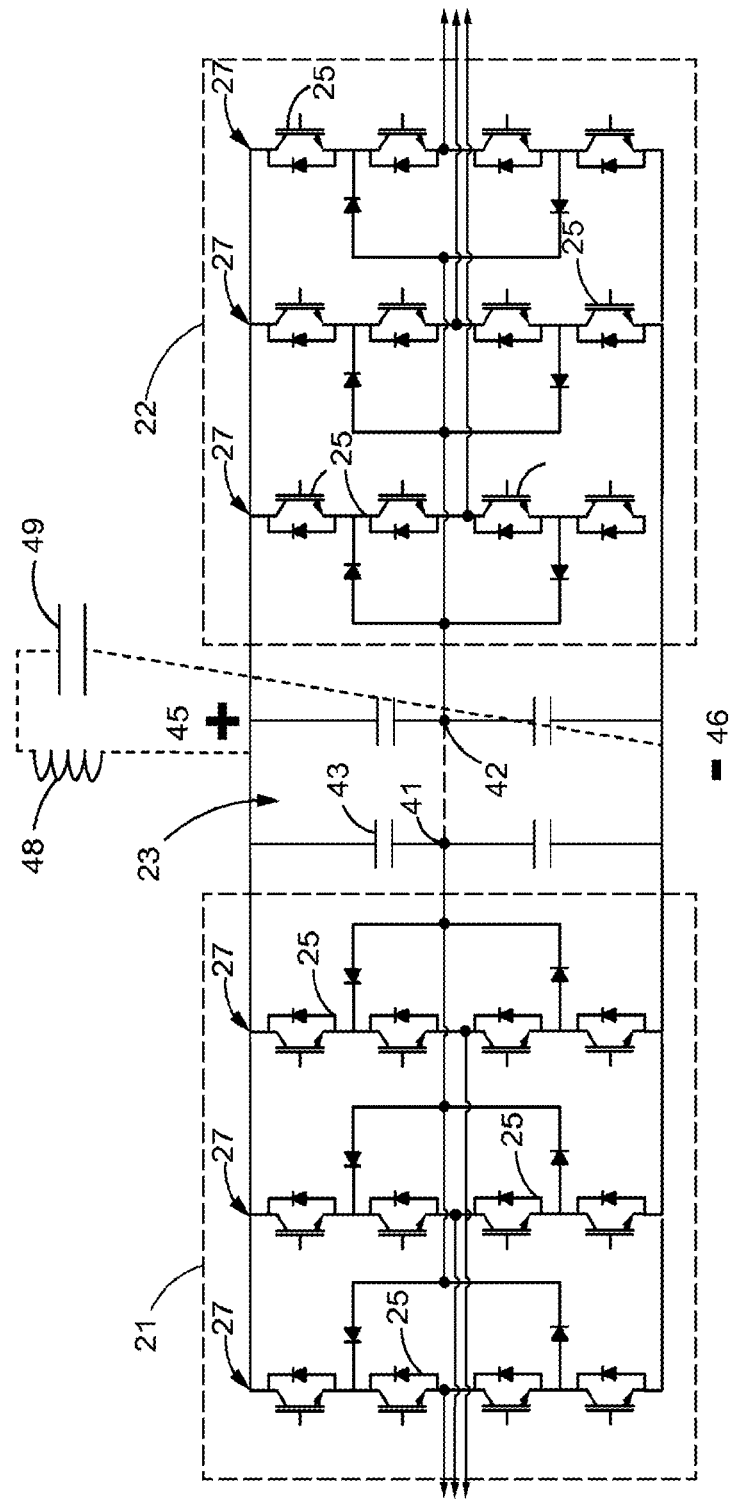
FIG. 3 is a schematic representation of the inverter and converter of the regenerative drive of FIG. 2, the inverter and converter both having a neutral point clamped (NPC) type topology.

Turning now to FIG. 3, the regenerative drive 20 may be a multilevel drive having a multilevel converter 21 and a multilevel inverter 22. In this example, the regenerative drive 20 may be a three-level drive with a three-level converter 21 and three-level inverter 22. More specifically each phase leg 27 of the multilevel converter 21 and multilevel inverter 22 may output three levels of voltage: a positive voltage, a neutral point voltage, and a negative voltage. Both the inverter 22 and the converter 21 may include a plurality of power devices 25, the power devices 25 grouped into the phase legs 27. Each phase leg 27 of the converter 21 may be in selective communication with each phase of the power source 19. Likewise, each phase leg 27 of the inverter 22 may be in selective communication with each phase of the motor 18. The power devices 25 in the converter 21 and inverter 22 may include a plurality of insulated gate bipolar transistors (IGBTs) and/or a plurality of diodes.

In such examples wherein the regenerative drive 20 is a multilevel regenerative drive, the design of the circuit may require multiple capacitors 43 to obtain the multiple levels with neutral points. When the capacitors 43 are in series, as seen in FIG. 3, the capacitance of the capacitors 43 is reduced because the total capacitance of capacitors in series reduced, as defined by the equation:

$$C_{total} = \frac{1}{\frac{1}{C_1} + \frac{1}{C_n} + \cdots + \frac{1}{C_n}}.$$

Including the secondary capacitor 49 raises the total effective capacitance because it is in parallel to the capacitors 43 and the capacitance of capacitors in series is the sum of the capacitance of the individual capacitors:

$$C_{total} = C_1 + C_2 + \ldots + C_n.$$

The secondary capacitor 49 does not need a neutral point and therefore a higher voltage single capacitor can be used rather than using two ½ voltage capacitors in series (which results in ½ the capacitance total).

Figure 4:
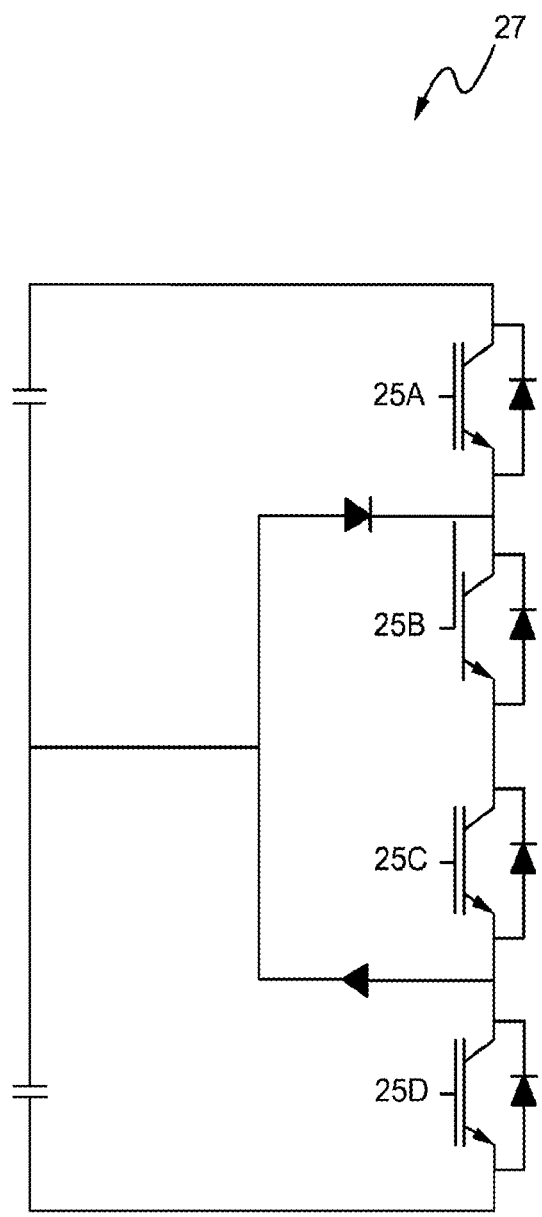
FIG. 4 is a schematic representation of a phase leg of the inverter and/or the converter, the phase leg having an NPC type topology.

As seen in FIG. 3, the inverter 22 and the converter 21 for the regenerative drive system 20 have a neutral point clamped type (NPC-type) topology. Additionally, FIG. 4 shows a phase leg 27 of the inverter 22 and/or converter 21, the phase leg 27 having the same NPC-type topology. An NPC-type topology utilizes the power components 25, in this example the IGBTs 25A-D, in a series arrangement to achieve a three-level PWM operation. When the devices are in series as in the NPC-type topology, power components 25 having a lower voltage rating may be used to achieve the same voltage across the device. Using an NPC-type topology may lead to cost savings due to the use of power components 25 having lower voltage ratings because of the lower cost associated with such components.

Figure 5:
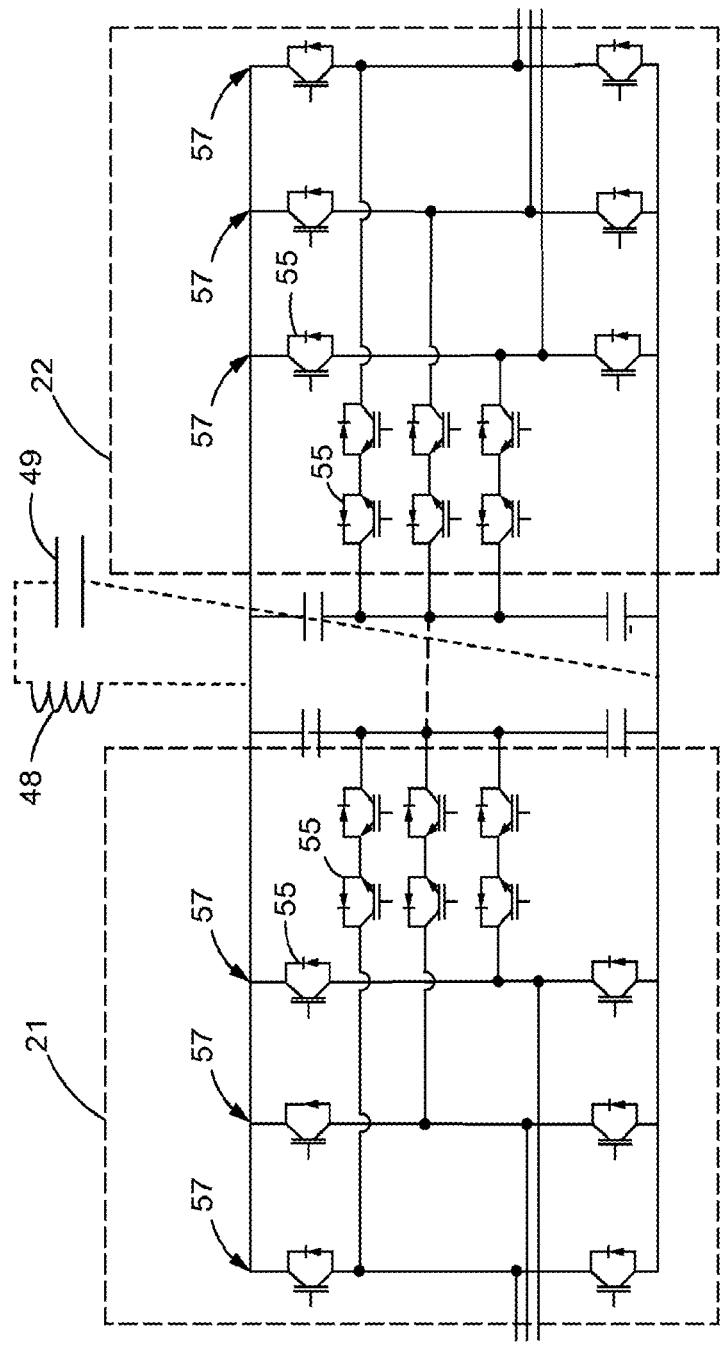
FIG. 5 is a schematic representation of the inverter and converter of the regenerative drive of FIG. 2, the inverter and converter both having a T-type topology.
Figure 6:
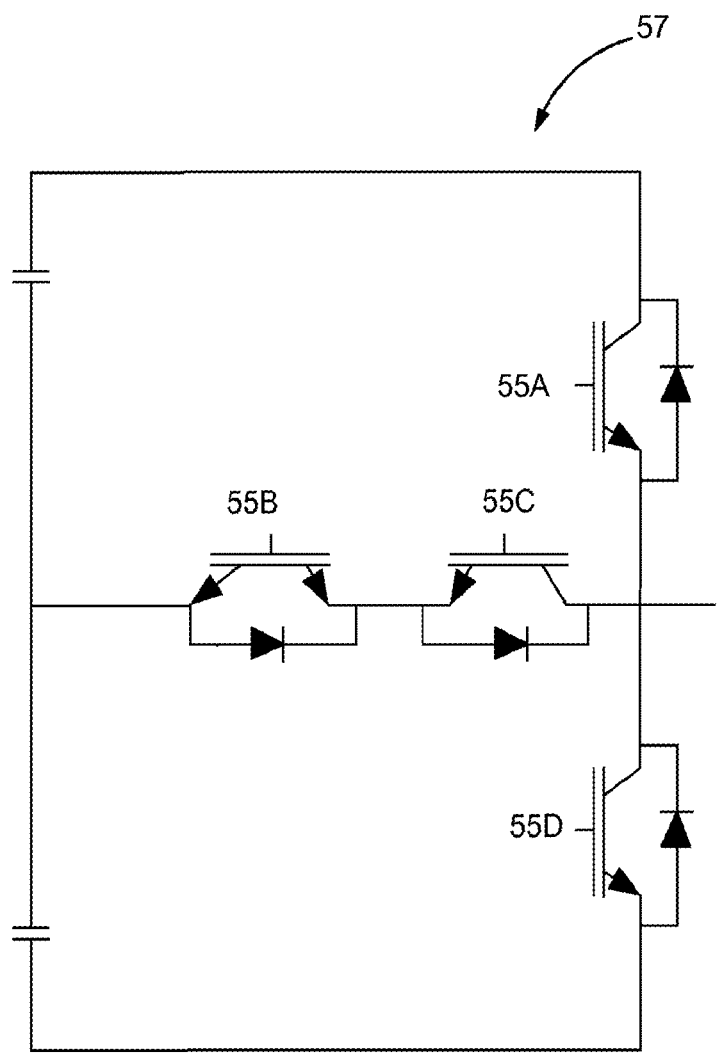
FIG. 6 is a schematic representation of a phase leg of the inverter and/or the converter, the phase leg having a T-type topology.

Turning to FIG. 5, an alternative inverter 22 and an alternative converter 21 for the regenerative drive system of FIG. 2 is shown, both the inverter 22 and converter 21 having a T-type topology. Additionally, FIG. 6 shows a phase leg 57 of the inverter 22 and/or converter 21, the phase leg 57 having the same T-type topology. A T-type topology utilizes the power components 55, in this example the IGBTs 55, in an arrangement where two IGBTs 55B, 55C are in series, those two IGBTs 55B, 55C being in parallel with another pair of IGBTs 55A, 55D, which are in series. Such an arrangement lowers the voltage rating needed across each pair because they are in series and also creates greater efficiency due to the two pairs of IGBTs being in parallel.

Figure 7:
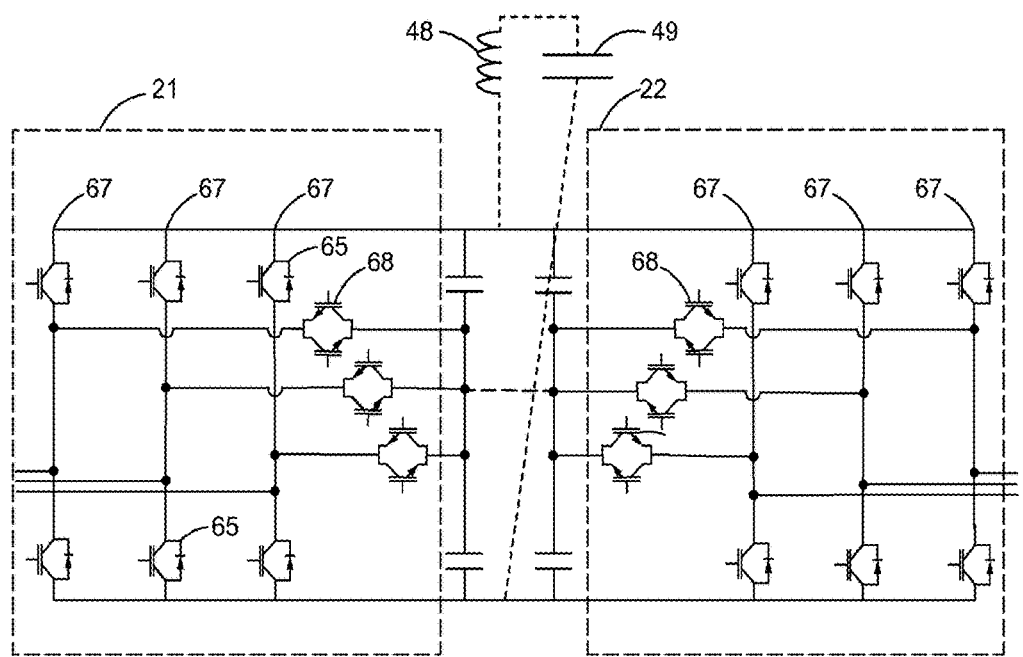
FIG. 7 is a schematic representation of the inverter and converter of the regenerative drive of FIG. 2, the inverter and converter both having an advanced T-type neutral point clamped (AT-NPC) type topology.
Figure 8:
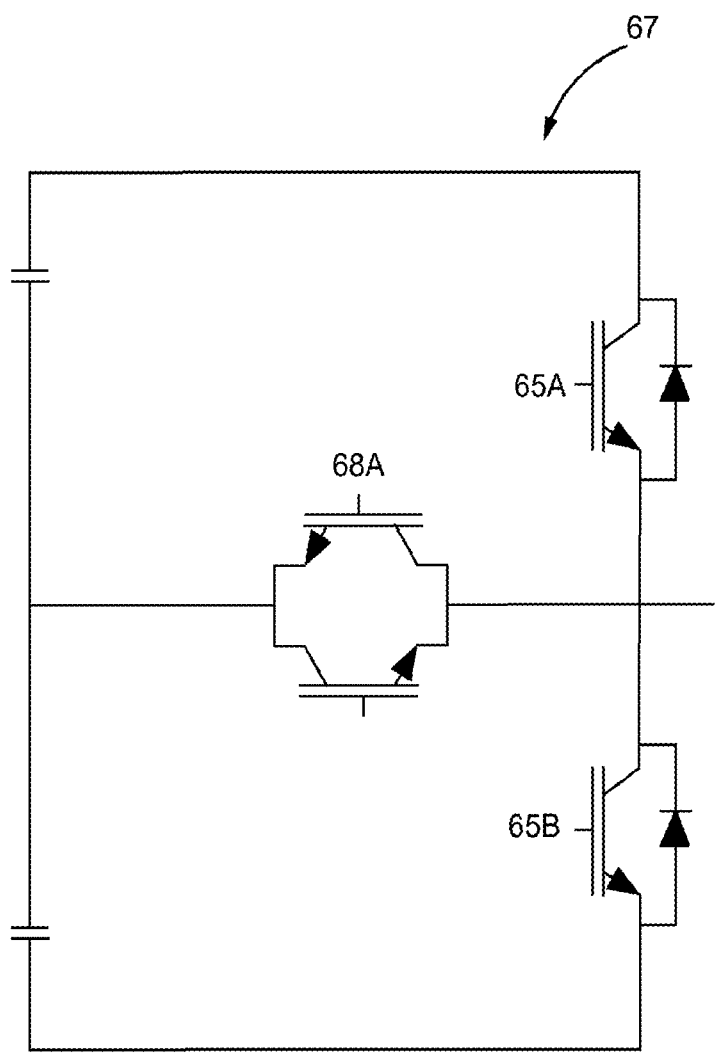
FIG. 8 is a schematic representation of a phase leg of the inverter and/or the converter, the phase leg having an AT-NPC type topology.

With reference to FIG. 7, another alternative inverter 22 and alternative converter 21 for the regenerative drive system 20 is shown wherein both the inverter 22 and converter 21 have an advanced T-type neutral point clamped (AT-NPC) topology. Additionally, FIG. 8 shows a phase leg 67 of the inverter 22 and/or converter 21, the phase leg 67 having the same AT-NPC type topology. Power components 65 of the AT-NPC type topology may include a reverse-blocking IGBT 68 (RB-IGBT), the RB-IGBT 68 connected to the other power components in parallel. The AT-NPC type topology may be associated with greater efficiency.

INDUSTRIAL APPLICABILITY

From the foregoing, it can be seen that the technology disclosed herein has industrial applicability in a variety of settings such as, but not limited to, systems and methods for designing a DC link associated with a regenerative drive. The regenerative drive may be used in conjunction with an elevator system. Using the teachings of the present disclosure, multilevel regenerative drives may be produced having optimized DC link configurations. This improvement over the prior art may improve the operation of the regenerative drive by limiting propagating harmonics, lessening acoustic noise, raising the efficiency of the device, and/or lowering costs of the device.

While the present disclosure has been in reference to a regenerative drive for an elevator system, one skilled in the art will understand that the teachings herein can be used in other applications as well. It is therefore intended that the scope of the invention not be limited by the embodiments presented herein as the best mode for carrying out the invention, but that the invention will include all equivalents falling within the spirit and scope of the claims as well.

What is claimed is:

1. A regenerative drive device, comprising:
    an inverter having a plurality of power components;
    a converter having a plurality of power components;
    a direct current (DC) link bridging the inverter and the converter, the DC link comprising:
        one or more internal capacitors bridging the inverter and the converter;
        an external capacitor in parallel with the one or more internal capacitors wherein the capacitance of the external capacitor is greater than the capacitance of at least one of the one or more internal capacitors; and
        an inductor located directly between the external capacitor and the one or more internal capacitors.

2. The regenerative drive device of claim 1, wherein the one or more internal capacitors are film capacitors.

3. The regenerative drive device of claim 1, wherein the external capacitor is an electrolytic capacitor, and wherein the one or more internal capacitors are film capacitors.

4. The regenerative drive device of claim 1, wherein drive device is an elevator drive.

5. The regenerative drive device of claim 1, wherein at least one member of the plurality of power components of the inverter is an insulated-gate bipolar transistor.

6. The regenerative drive device of claim 1, wherein at least one member of the plurality of power components of the converter is an insulated-gate bipolar transistor.

7. The regenerative drive device of claim 1, wherein the regenerative drive is a multi-level regenerative drive, wherein the one or more internal capacitors comprises a plurality of internal capacitors.

8. The regenerative drive device of claim 7, wherein the capacitance of the external capacitor is greater than a capacitance of the plurality of internal capacitors, wherein the capacitance of the plurality of internal capacitors comprises a combination of the capacitance of each of the plurality of internal capacitors.

9. The regenerative drive device of claim 7, wherein the plurality of power components of the inverter and the plurality of power components of the converter are arranged having a T-type topology.

10. The regenerative drive device of claim 7, wherein the plurality of power components of the inverter and the plurality of power components of the converter are arranged having a neutral-point-clamped topology.

11. The regenerative drive device of claim 7, wherein the plurality of power components of the inverter and the plurality of power components of the converter are arranged having an advanced T-type neutral point clamped topology.

12. The regenerative drive device of claim 11, wherein at least one member of the plurality of power components of the inverter and at least one member of the plurality of power components of the converter is a reverse-blocking insulated-gate bipolar transistor.

13. A method for buffering energy in a regenerative elevator drive device, the regenerative elevator drive device including a inverter having a plurality of power components and a converter having a plurality of power components, the method comprising:
    providing a direct current (DC) link bridging the inverter and the converter, the DC link comprising:
        one or more internal capacitors bridging the inverter and the converter for energy buffering;
        an external capacitor in parallel with the one or more internal capacitors for energy buffering, wherein the capacitance of the external capacitor is greater than the capacitance of at least one of the one or more internal capacitors; and
        an inductor located directly between the external capacitor and the one or more internal capacitors.

14. The method of claim 13, wherein the regenerative elevator drive device is a multi-level regenerative elevator drive device.

15. An elevator system, comprising:
    an elevator car disposed in a hoistway;
    a motor operatively connected to the elevator car, the motor generating a thrust force to move the elevator car within the hoistway;
    a power source operatively connected to the motor, the power source supplying power to the motor; and
    a regenerative elevator drive device operatively connected to the power source and the motor, the regenerative elevator drive device comprising:
        an inverter having a plurality of power components;
        a converter having a plurality of power components; and
        a direct current (DC) link bridging the inverter and the converter, the DC link comprising:
            one or more internal capacitors bridging the inverter and the converter;
            an external capacitor in parallel with the one or more internal capacitors, wherein the capacitance of the external capacitor is greater than the capacitance of at least one of the one or more internal capacitors; and
            an inductor located directly between the external capacitor and the one or more internal capacitors.

16. The elevator system of claim 15, wherein the regenerative elevator drive device is a multi-level regenerative elevator drive device.

17. The elevator system of claim 16, wherein the plurality of power components of the inverter and the plurality of power components of the converter are arranged having a neutral point clamped, a T-type, or an advanced T-type neutral point clamped topology.

18. The elevator system of claim 15, wherein the external capacitor is accessible independent of the regenerative elevator drive device.

19. The elevator system of claim 15, wherein at least one member of the plurality of power components of the inverter and at least one member of the plurality of power components for the converter is an insulated-gate bipolar transistor.

20. The elevator system of claim 17, wherein at least one member of the plurality of power components of the inverter and at least one member of the plurality of power components for the converter is a reverse-blocking insulated-gate bipolar transistor.

* * * * *